United States Patent
Wang et al.

(10) Patent No.: US 12,231,176 B1
(45) Date of Patent: Feb. 18, 2025

(54) QUANTUM KEY DISTRIBUTION SYSTEM

(71) Applicant: UNIVERSITY OF SCIENCE AND TECHNOLOGY OF CHINA, Anhui (CN)

(72) Inventors: Shuang Wang, Anhui (CN); Jiaxuan Li, Anhui (CN); Yuanguanjie Fan, Anhui (CN); Fengyu Lu, Anhui (CN); Zhenqiang Yin, Anhui (CN); Deyong He, Anhui (CN); Wei Chen, Anhui (CN); Zheng Zhou, Anhui (CN); Guangcan Guo, Anhui (CN); Zhengfu Han, Anhui (CN)

(73) Assignee: UNIVERSITY OF SCIENCE AND TECHNOLOGY OF CHINA, Anhui (CN)

( * ) Notice: Subject to any disclaimer, the term of this patent is extended or adjusted under 35 U.S.C. 154(b) by 0 days.

(21) Appl. No.: 18/924,618

(22) Filed: Oct. 23, 2024

(30) Foreign Application Priority Data

Oct. 26, 2023 (CN) .......................... 202311396867.9

(51) Int. Cl.
 *H04B 10/00* (2013.01)
 *H04B 10/532* (2013.01)
 (Continued)

(52) U.S. Cl.
 CPC ........... *H04B 10/70* (2013.01); *H04B 10/532* (2013.01)

(58) Field of Classification Search
 CPC ..................................................... H04B 10/70
 See application file for complete search history.

(56) References Cited

U.S. PATENT DOCUMENTS

2008/0037998 A1* 2/2008 Zhengfu ............... H04L 9/0858
                                                                398/184
2023/0283459 A1  9/2023 Lim et al.

FOREIGN PATENT DOCUMENTS

CN        107332627 A    11/2017
CN        209170385 U     7/2019
              (Continued)

OTHER PUBLICATIONS

Lu, Fengyu, et al., "Uncharacterized-Source Measurement-Device-Independent Quantum Key Distribution Experiment with Over 50 km Fiber," *Acta Optica Sinica*, vol. 42, Issue 3, 8 pages (2022).

(Continued)

*Primary Examiner* — Daniel G Dobson
(74) *Attorney, Agent, or Firm* — Christensen, Fonder, Dardi & Herbert PLLC (57) ABSTRACT

A quantum key distribution system is provided, including: a sending terminal, a measurement terminal, a receiving terminal, and at least one polarization controller. The sending terminal is configured to generate a quantum optical signal and receive a detection result. The measurement terminal includes a beam splitter and two single-photon detectors, the beam splitter is configured to generate two measurement optical signals based on the quantum optical signal, and the two single-photon detectors are configured to generate the detection result. The receiving terminal is configured to receive the detection result. The at least one polarization controller is provided in the sending terminal, the measurement terminal or the receiving terminal, and performs a polarization processing on the quantum optical signal or the detection result using a target transmittance matrix determined based on the detection result, so as to obtain a polarized quantum optical signal or a polarized detection result.

9 Claims, 4 Drawing Sheets

(51) Int. Cl.
*H04B 10/70* (2013.01)
*H04J 14/00* (2006.01)

(56) References Cited

FOREIGN PATENT DOCUMENTS

| | | |
|---|---|---|
| CN | 114337846 A | 4/2022 |
| CN | 115913551 A | 4/2023 |
| CN | 116015642 A | 4/2023 |
| JP | 2010-233123 A | 10/2010 |
| WO | WO 2023/072329 A1 | 5/2023 |

OTHER PUBLICATIONS

Yang, Ru, et al., "Research Progress on Key Technologies of Free-Space Quantum Key Distributions," *Laser & Optoelectronics Progress*, vol. 55, 8 pages (2018).

\* cited by examiner

QUANTUM KEY DISTRIBUTION SYSTEM

CROSS-REFERENCE TO RELATED APPLICATION(S)

This application claims the benefit of Chinese Patent Application No. 202311396867.9 filed on Oct. 26, 2023, the whole disclosure of which is incorporated herein by reference.

TECHNICAL FIELD

The present disclosure relates to the field of quantum communication technology, and more specifically, to a quantum key distribution system.

BACKGROUND

In order to eliminate the impact of polarization on the measurement device independent (MDI) protocol, it is necessary to correct the channel polarization or adopt special protocols, such as the Plug & Play MDI protocol or a new MDI protocol with environmental robustness.

The methods for correcting the channel polarization may be roughly divided into two categories. One is methods that require reference strong light to perform the wavelength division multiplexing or the time division multiplexing, and the other is methods in which weak light for communication is directly used to correct the polarization.

In the process of realizing the concept of the present disclosure, the inventors found that there are at least the following problems in the related art: the above two types of methods for correcting the channel polarization may not only have the problems of delay and a high bit error rate in the actual process of the polarization correction, but also cause certain security problems.

SUMMARY

In order to solve at least one of the above-mentioned and other technical problems in the prior art, embodiments of the present disclosure provide a quantum key distribution system, which may correct additional bit errors due to the polarization deviation caused by polarization drift of an optical fiber channel in a non-polarization-encoded measurement device independent quantum key distribution (MDIQKD) system.

In an aspect, the embodiments of the present disclosure provide a quantum key distribution system, including:

a sending terminal, configured to generate a quantum optical signal and receive a detection result;

a measurement terminal, including:

beam splitter, configured to generate two measurement optical signals based on the quantum optical signal;

two single-photon detectors, configured to generate the detection result which is disclosed to the sending terminal and a receiving terminal, where the detection result includes a coincidence count rate, and detection response rates respectively corresponding to different single-photon detectors; and the receiving terminal, configured to receive the detection result, where the quantum key distribution system further includes:

at least one polarization controller, provided in the sending terminal, the measurement terminal or the receiving terminal, where the at least one polarization controller performs a polarization processing on the quantum optical signal or the detection result using a target transmittance matrix determined based on the detection result, so as to obtain a polarized quantum optical signal or a polarized detection result.

According to the embodiments of the present disclosure, the at least one polarization controller is provided in the sending terminal, the measurement terminal or the receiving terminal, and the at least one polarization controller performs the polarization processing on the quantum light signal or the detection result using the target transmittance matrix determined based on the detection result to obtain the polarized quantum light signal or the polarized detection result, so that in a non-polarization-encoded measurement device-independent quantum key distribution protocol, it is possible to correct the polarization drift of the optical fiber channel and lower the bit error rate caused by the polarization drift. Therefore, the technical problem of delay in correcting the polarization using a quantum bit error rate (QBER) binding algorithm based on the weak light for communication and the technical problem of security are at least partially overcome. In this way, the weak light is still used, but there is no need to monitor QBER, the amount discarded in normal communication is monitored without disclosing the sent bits, the response speed is fast, and there is no need to process and calculate the bit error rate, so that there may be no delay or security problem.

BRIEF DESCRIPTION OF THE DRAWINGS

The above and other objectives, features and advantages of the present disclosure will become more apparent through the following description of the embodiments of the present disclosure with reference to the accompanying drawings, in which.

DETAILED DESCRIPTION OF EMBODIMENTS

Hereinafter, the embodiments of the present disclosure will be described with reference to the accompanying drawings. However, it should be understood that these descriptions are exemplary only and are not intended to limit the scope of the present disclosure. In the following detailed descriptions, for convenience of explanation, numerous specific details are set forth to provide a comprehensive understanding of the embodiments of the present disclosure. However, it is evident that one or more embodiments may be implemented without these specific details. In addition, in the following description, description of well-known structures and techniques are omitted to avoid unnecessarily confusing the concepts of the present disclosure.

The terms used herein are for describing the specific embodiments only, and are not intended to limit the present disclosure. The terms "including", "comprising" and the like used herein indicate the existence of the stated features, steps, operations and/or components, but do not exclude the existence or addition of one or more other features, steps, operations or components.

All the terms (including technical and scientific terms) used herein have the same meanings as commonly understood by those skilled in the art unless otherwise defined. It should be noted that the terms used herein should be interpreted as having a meaning consistent with the context of the present specification and should not be interpreted in an idealized or overly rigid manner.

When using expressions such as "at least one of A, B, C, or the like", they should generally be interpreted according to the meaning of the expression commonly understood by those skilled in the art (e.g., "a system including at least one of A, B, or C" should include but is not limited to a system including A alone, B alone, C alone, A and B, A and C, B and C, and/or A, B and C).

In the prior, the methods for correcting the channel polarization may be roughly divided into two categories. One is methods that require reference strong light to perform wavelength division multiplexing or time division multiplexing, and the other is methods that directly use weak light for communication to the correct polarization.

The first category that requires the reference strong light to perform the wavelength division multiplexing or the time division multiplexing has been fully developed, from the early scheme based on wavelength division multiplexing that requires a long accumulation time, to the scheme that uses continuous coherent light and shortens the polarization modulation period to less than 3 minutes using the visibility as the criterion, and then to the wavelength division multiplexing scheme that realizes millisecond-level modulation time in an actual overhead optical fiber system.

The second category directly uses the weak light for communication to perform the polarization correction, which can be roughly divided into two types of schemes: sending a specific reference signal to determine the polarization state and directly using a QBER binding algorithm to correct the polarization. The first type, which periodically sends a specific signal state through agreement of a protocol, can perform time alignment and polarization compensation simultaneously, achieving a feedback cycle of 1 s. In the second type that directly uses QBER as the basis of modulation, in addition to the most basic gradient descent algorithm modulation that uses QBER as the criterion, there is also the latest scheme that uses the bit error rate(s) to correspond to circles on the Poincare sphere and locates the focus of the QBER circles and the modulation trajectory on the Poincare sphere through specific polarization changes, so as to determine the polarization state.

The inventors have found there are at least the following problems in the related art.

(1) Special protocols, such as the Plug & Play MDI protocol, require a reciprocation optical path structure during the state preparation, which may introduce security problems, and the environmental robustness MDI protocol requires major changes to the measurement device at the measurement terminal.

(2) The use of a system of wavelength division multiplexing or time division multiplexing faces problems such as the birefringence effect related to the wavelength and the change of optical fiber polarization over time, as well as the light leakage problem caused by the strong light used for the correction.

(3) The existing schemes in which the weak light serves as the feedback criterion require a long time for data accumulation, which may be inapplicable when the fiber birefringence changes rapidly; the polarization using QBER requires waiting for both parties to complete the processing of the current bit and then calculate the QBER, which has certain delay, and additional auxiliary calibration may lead to new security problems.

On this basis, the inventors found that by using the weak light to monitoring the amount discarded in the normal communication instead of monitoring QBER, there is no need to disclose the sent bits, so that the delay, the high bit error rate and security problems may be avoided.

In view of this, the present disclosure provides a quantum key distribution system. The quantum key distribution system includes: a sending terminal, a beam splitter, two single-photon detectors, a receiving terminal, and at least one polarization controller. The sending terminal is configured to generate a quantum optical signal and receive a detection result. The measurement terminal includes the beam splitter and the two single-photon detectors, where the beam splitter is configured to generate two measurement optical signals based on the quantum optical signal, and the two single-photon detectors are configured to generate the detection result which is disclosed to the sending terminal and the receiving terminal. The receiving terminal is configured to receive the detection result. The at least one polarization controller is provided in the sending terminal, the measurement terminal or the receiving terminal, and performs a polarization processing on the quantum optical signal or the detection result using a target transmittance matrix determined based on the detection result, so as to obtain a polarized quantum optical signal or a polarized detection result.

Figure 1:
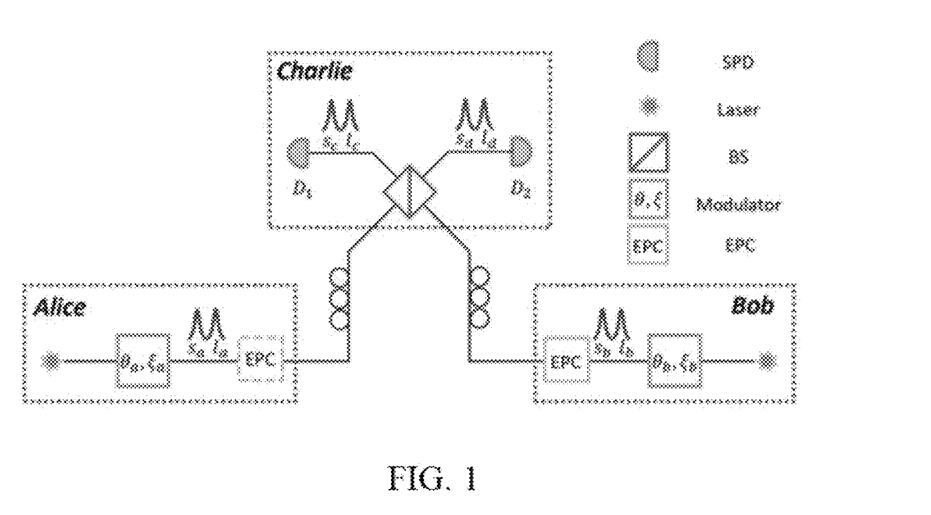
FIG. 1 shows a block diagram of a structure of a quantum key distribution system according to an embodiment of the present disclosure.

FIG. 1 shows a block diagram of a structure of a quantum key distribution system according to an embodiment of the present disclosure.

As shown in FIG. 1, the quantum key distribution system includes: a sending terminal, a measurement terminal, and a receiving terminal. The sending terminal is configured to generate a quantum optical signal and receive a detection result. The measurement terminal includes a beam splitter and two single-photon detectors. The beam splitter is configured to generate two measurement optical signals based on the quantum optical signal. The two single-photon detectors are configured to generate the detection result which is disclosed to the sending terminal and the receiving terminal. In the quantum key distribution system, SPD is a single-photon detector, Laser is a laser, BS is a beam splitter, Modulator is a phase modulator, and EPC is a polarization controller. The detection result includes a coincidence count rate and detection response rates respectively corresponding to different single-photon detectors. The receiving terminal is configured to receive the detection result. The quantum key distribution system further includes at least one polarization controller, provided in the sending terminal or the receiving terminal. The at least one polarization controller performs a polarization processing on the quantum optical signal or the detection result using a target transmittance matrix determined based on the detection result, so as to obtain a polarized quantum optical signal or a polarized detection result.

According to some embodiments of the present disclosure, when the polarization controller is provided in the sending terminal Alice (or Bob), the sending terminal Alice (or Bob) generates a quantum optical signal, the polarization controller performs a polarization processing on the quantum optical signal and sends it to the measurement terminal Charlie, and the measurement terminal Charlie detects the polarized quantum light signal, obtains a detection result and discloses the detection result. Specifically, the detection result is transmitted to the receiving terminal Bob (or Alice) through a channel such as an optical fiber.

In this embodiment, the polarization controller is provided in the sending terminal or the receiving terminal, and such implementation may ignore the loss caused by the polarization controller. This is because in such implementation, the polarization controller is installed in an MDI-QKD user terminal, and the loss caused by the polarization controller may be compensated without affecting the security of QKD and thus may be ignored.

In this embodiment, at least one polarization controller is used and provided in the sending terminal or the receiving terminal, and the at least one polarization controller performs the polarization processing on the quantum light signal or the detection result using the target transmittance matrix determined based on the detection result to obtain the polarized quantum light signal or the polarized detection result, so that in a non-polarization-encoded measurement device-independent quantum key distribution protocol, it is possible to correct the polarization drift of the optical fiber channel and lower the bit error rate caused by the polarization drift. Therefore, the technical problem of delay in correcting the polarization using a QBER combination algorithm based on the weak light for communication and the technical problem of security are at least partially overcome. In this way, the weak light is still used, but there is no need to monitor QBER, the amount discarded in normal communication is monitored without disclosing the sent bits, the response speed is fast, and there is no need to process and calculate the bit error rate, so that the technical effect of no delay and no security problem may be achieved.

Figure 2:
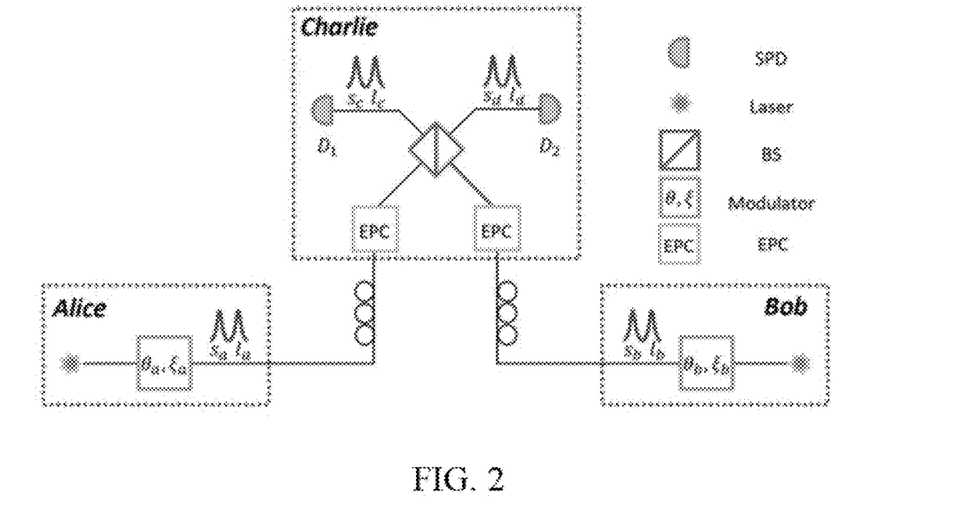
FIG. 2 shows a block diagram of a structure of a quantum key distribution system according to another embodiment of the present disclosure.

FIG. 2 shows a block diagram of a structure of a quantum key distribution system according to another embodiment of the present disclosure.

In some embodiments of the present disclosure, alternatively, as shown in FIG. 2, the quantum key distribution system may include a sending terminal, a measurement terminal, a receiving terminal, and at least one polarization controller. In the quantum key distribution system, SPD is a single-photon detector, Laser is a laser, BS is a beam splitter, Modulator is a phase modulator, and EPC is a polarization controller. The measurement terminal may include a beam splitter, two single-photon detectors and two polarization controllers. The beam splitter is connected to an output terminal of a main component of the sending terminal and an input terminal of a main component of the receiving terminal. The beam splitter generates two measurement optical signals based on the quantum optical signal generated by the sending terminal. The two single-photon detectors are respectively connected to the beam splitter and disclose the detection result to the sending terminal and the receiving terminal based on the two measurement optical signals generated by the beam splitter. The two polarization controllers are connected to an input terminal and an output terminal of a main component of the measurement terminal respectively, and the polarization controllers perform a polarization processing on the quantum optical signal or the detection result using a target transmittance matrix determined based on the detection result, so as to obtain a polarized quantum optical signal or a polarized detection result.

According to some embodiments of the present disclosure, when the polarization controllers are provided in the measurement terminal Charlie, a quantum optical signal is generated by the sending terminal Alice (or Bob), and the quantum optical signal is sent to the measurement terminal Charlie. The polarization controller performs a polarization processing on the quantum optical signal and send it to the beam splitter to generate two measurement optical signals. Then, the two single-photon detectors detect the two measurement optical signals respectively and disclose the detection result to the Alice terminal and the Bob terminal respectively. The polarization controller performs a polarization processing on the detection result again to obtain a polarized detection result. The receiving terminal Bob (or Alice) receives the polarized detection result.

In this embodiment, the polarization controller is provided in the measurement terminal, and such implementation may permit a continuous operation and it is not necessary to reach a threshold before starting like conventional polarization correction methods. In such implementation, if the polarization has been corrected, there will be no additional impact on the polarization. This enables such implementation time-free and more suitable for a fast and long-term polarization correction compared to the existing methods.

According to some embodiments of the present disclosure, when the polarization controller is provided in the sending terminal, the output terminal of the main component of the sending terminal is connected to the polarization controller. Or, when the polarization controller is provided in the receiving terminal, the input terminal of the main component of the receiving terminal is connected to the polarization controller.

According to some embodiments of the present disclosure, the target transmittance matrix is generated by: obtaining first target parameter values of the polarization controller working under different transmittance matrices in different sub-periods, where the different transmittance matrices are determined based on an initial transmittance matrix and preset Jones matrices; and generating the target transmittance matrix for an $(i+1)^{th}$ period based on the first target parameter values.

According to some embodiments of the present disclosure, the polarization controller modulates the polarization of light by setting different transmittance matrices.

According to some embodiments of the present disclosure, the different transmittance matrices are determined by the initial transmittance matrix and the preset Jones matrices. For example, the initial transmittance matrix is U, a first preset Jones matrix is $U_1$, and a first transmittance matrix is $UU_1$; and the initial transmittance matrix is U, a second preset Jones matrix is $U_2$, and a second transmittance matrix is $UU_2$.

According to some embodiments of the present disclosure, a period represents a process of modulation that the polarization controller needs to perform to generate a target transmittance matrix from an initial transmittance matrix. A target transmittance matrix, to be executed by the polarization controller, generated in an $i^{th}$ period is an initial transmittance matrix to be executed by the polarization controller in an $(i+1)^{th}$ period. For example, a target transmittance matrix, to be executed by the polarization controller, generated in a first period is an initial transmittance matrix to be executed by the polarization controller in a second period; and a target transmittance matrix, to be executed by the polarization controller, generated in the second period is an initial transmittance matrix to be executed by the polarization controller in a third period.

According to some embodiments of the present disclosure, the $i^{th}$ period includes an $i^{th}$ sub-period, an $(i+1)^{th}$ sub-period, an $(i+2)^{th}$ sub-period, an $(i+3)^{th}$ sub-period, etc. For example, the first period includes a first sub-period, a second sub-period, a third sub-period, etc.

According to some embodiments of the present disclosure, the polarization controller monitors a system response rate with N responses as a sub-period. For example, one sub-period is of 100 responses, 200 responses, 300 responses, 400 responses, 500 responses, 600 responses, etc.

Figure 3:
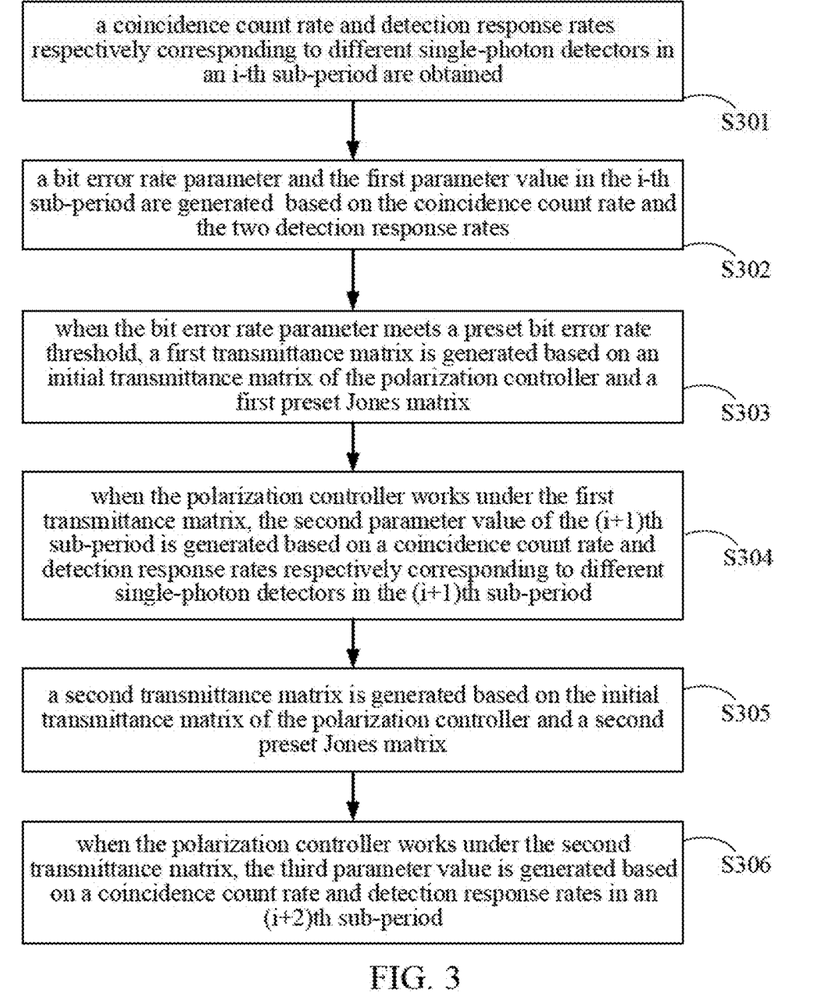
FIG. 3 shows a flow chart of obtaining first target parameter values by a quantum key distribution system according to an embodiment of the present disclosure.

FIG. 3 shows a flow chart of obtaining first target parameter values by a quantum key distribution system according to an embodiment of the present disclosure.

According to some embodiments of the present disclosure, the first target parameter values include a first parameter value, a second parameter value, and a third parameter value. As shown in FIG. 3, the first target parameter values of the polarization controller working under different transmittance matrices in different sub-periods are obtained respectively, which includes operations S301 to S306.

According to some embodiments of the present disclosure, operation S301 includes: obtaining a coincidence count rate $Q_{12}$ and detection response rates $D_1$ and $D_2$ respectively corresponding to different single-photon detectors in the $i^{th}$ sub-period.

According to some embodiments of the present disclosure, operation S302 includes: generating a bit error rate parameter and the first parameter value in the $i^{th}$ sub-period based on the coincidence count rate and the two detection response rates.

According to some embodiments of the present disclosure, operation S303 includes: when the bit error rate parameter meets a preset bit error rate threshold, generating a first transmittance matrix based on an initial transmittance matrix of the polarization controller and a first preset Jones matrix.

According to some embodiments of the present disclosure, operation S304 includes: when the polarization controller works under the first transmittance matrix, generating the second parameter value of the $(i+1)^{th}$ sub-period based on a coincidence count rate and detection response rates respectively corresponding to different single-photon detectors in the $(i+1)^{th}$ sub-period.

According to some embodiments of the present disclosure, operation S305 includes: generating a second transmittance matrix based on the initial transmittance matrix of the polarization controller and a second preset Jones matrix.

According to some embodiments of the present disclosure, operation S306 includes: when the polarization controller works under the second transmittance matrix, generating the third parameter value based on a coincidence count rate and detection response rates in an $(i+2)^{th}$ sub-period, where the $i^{th}$ period includes the $i^{th}$ sub-period, the $(i+1)^{th}$ sub-period, and the $(i+2)^{th}$ sub-period. For example, the first period includes the first sub-period, the second sub-period, and the third sub-period.

According to some embodiments of the present disclosure, the bit error rate parameter may be expressed by formula (1), where the initial transmittance matrix is U, the first preset Jones matrix is $U_1$, the first transmittance matrix is $UU_1$; the second preset Jones matrix is $U_2$; and the second transmittance matrix is $UU_2$. The first target parameter value may be expressed by formula (2), where the first target parameter value $\delta$ includes the first parameter value $\delta_1$, the second parameter value $\delta_2$ and the third parameter value $\delta_3$; and the preset bit error rate threshold is $E_{th}$.

$$\frac{Q_{12}}{D_1 D_2} \quad (1)$$

$$\delta = 2\left(1 - \frac{Q_{12}}{D_1 D_2}\right) \quad (2)$$

In the $i^{th}$ period, the polarization controller works under the target transmittance matrix determined by the $(i-1)^{th}$ period. At this time, if the bit error rate parameter of the $i^{th}$ period does not meet the preset bit error rate threshold, the target transmittance matrix for the $i^{th}$ period is not generated, so that in the $(i+1)^{th}$ period, the polarization controller still works under the target transmittance matrix determined in the $(i-1)^{th}$ period. Likewise, if each of the bit error rate parameters in a plurality of subsequent periods does not meet the preset bit error rate threshold, the polarization controller in the current period continues to work under the target transmittance matrix determined for the last time in the historical periods.

According to some embodiments of the present disclosure, when the polarization controller is provided in the sending terminal or in the receiving terminal, the specific implementation steps are as follows, including operations S301 to S306.

For ease of description, the first preset Jones matrix $U_1$ and the second preset Jones matrix $U_2$ to be executed by the polarization controller are respectively as shown by formulas (3) and (4), where i in formula (4) is an imaginary unit.

$$U_1 = \frac{\sqrt{2}}{2}\begin{bmatrix} 1 & -1 \\ -1 & 1 \end{bmatrix} \quad (3)$$

$$U_2 = \frac{\sqrt{2}}{2}\begin{bmatrix} 1 & i \\ i & 1 \end{bmatrix} \quad (4)$$

The X-basis bit error rate of MDI-QKD is required to be limited to within $E_{th}$.

In operation 301, for each data collection process, single detector response rates $D_1$ and $D_2$ of the two long arms in the detector terminal and a corresponding coincidence count rate $Q_{12}$ are recorded.

In operation 302, the initial transmittance matrix modulated by the polarization controller before performing this step is recorded as U. The polarization controller maintains the modulated initial transmittance matrix U. While the QKD process is normally performed, the system response rates $D_1$ and $D_2$ are monitored with N responses as the $i^{th}$ sub-period, until the bit error rate parameter meets the preset bit error rate threshold, as shown by formula (5), and the first parameter value $\delta_1$ at this time is recorded.

$$\frac{Q_{12}}{D_1 D_2} > 2E_{th} \quad (5)$$

In operation 303, when the bit error rate parameter meets the preset bit error rate threshold, the first transmittance matrix $UU_1$ is generated based on the initial transmittance matrix U of the polarization controller and the first preset Jones matrix $U_1$.

In operation 304, when the polarization controller works under the first transmittance matrix $UU_1$, while the QKD process is normally performed, data of N responses in the $(i+1)^{th}$ sub-period is recorded, and the second parameter value $\delta_2$ at this time is calculated.

In operation 305, when the bit error rate parameter meets the preset bit error rate threshold, the second transmittance matrix $UU_2$ is generated based on the initial transmittance matrix U of the polarization controller and the second preset Jones matrix $U_2$.

In operation 306, when the polarization controller works under the second transmittance matrix $UU_2$, while the QKD process is normally performed, data of N responses in the $(i+2)^{th}$ sub-period is recorded, and the third parameter value $\delta_3$ at this time is calculated.

According to an embodiment of the present disclosure, generating the target transmittance matrix for the $(i+1)^{th}$ period based on the plurality of first target parameter values includes: generating a first variable value and a second variable value based on the first parameter value, the second parameter value and the third parameter value; and generating the target transmittance matrix for the $(i+1)^{th}$ period based on the first variable value, the second variable value and the initial transmittance matrix.

According to some embodiments of the present disclosure, the first variable value θ and the second variable value φ are calculated based on the first parameter value $\delta_1$, the second parameter value $\delta_2$, and the third parameter value $\delta_3$. The first variable value may be expressed by formula (6), and the second variable value may be expressed by formula (7). The target transmittance matrix $U_{final}$ of the $(i+1)^{th}$ period is generated based to the first variable value, the second variable value and the initial transmittance matrix, which may be expressed by formula (8), where i is an imaginary unit. In this way, the polarization correction is completed, and when the polarization controller performs this modulation, the polarization arriving at the measurement terminal is the same.

According to some embodiments of the present disclosure, the target transmittance matrix $U_{final}$ may serve as the initial transmittance matrix of the $(i+1)^{th}$ period, and operations S301 to S306 are repeated again.

$$\theta = \arccos(\sqrt{\delta_1}) \theta \in \left[0, \frac{\pi}{2}\right] \quad (6)$$

$$\varphi = \begin{cases} \arcsin\left(\frac{1-2\delta_3}{\sqrt[2]{\delta_1\sqrt{1-\delta_1}}}\right), & |1-2\delta_3| < 2\delta_2 - 1 \\ \arccos\left(\frac{2\delta_2-1}{\sqrt[2]{\delta_1\sqrt{1-\delta_1}}}\right), & |2\delta_2-1| < 1 - 2\delta_3 \\ \pi - \arcsin\left(\frac{1-2\delta_3}{\sqrt[2]{\delta_1\sqrt{1-\delta_1}}}\right), & |1-2\delta_3| < 1 - 2\delta_2 \\ 2\pi - \arccos\left(\frac{2\delta_2-1}{\sqrt[2]{\delta_1\sqrt{1-\delta_1}}}\right), & |\delta_2-1| < 2\delta_3 - 1 \end{cases} \quad (7)$$

$$U_{final} = U \begin{bmatrix} 1 & 0 \\ 0 & e^{-i\varphi} \end{bmatrix} \begin{bmatrix} \cos(\theta) & -\sin(\theta) \\ \sin(\theta) & \cos(\theta) \end{bmatrix} \quad (8)$$

Figure 4:
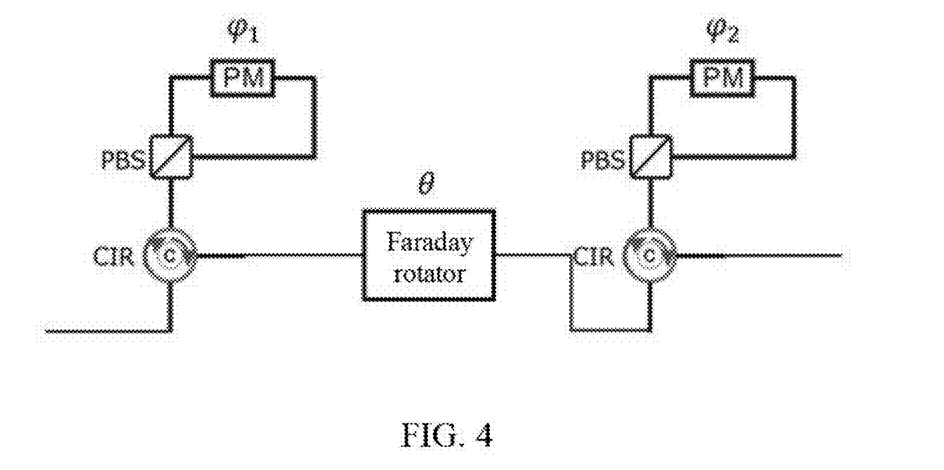
FIG. 4 shows a schematic structural diagram of a polarization controller constructed based on at least one phase modulator and a Faraday rotator according to an embodiment of the present disclosure.
Figure 5:
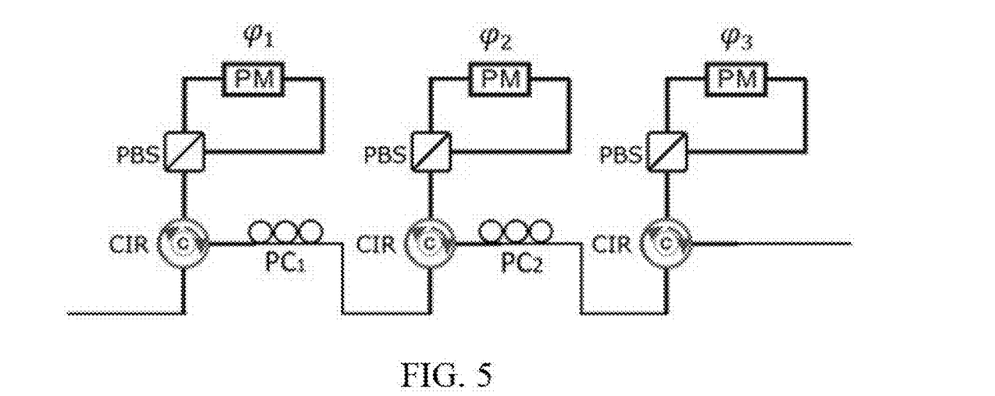
FIG. 5 shows a schematic structural diagram of a polarization controller constructed based on a plurality of phase modulators according to an embodiment of the present disclosure.

FIG. 4 shows a schematic structural diagram of a polarization controller constructed based on at least one phase modulator and a Faraday rotator according to an embodiment of the present disclosure. FIG. 5 shows a schematic structural diagram of a polarization controller constructed based on a plurality of phase modulators according to an embodiment of the present disclosure.

According to some embodiments of the present disclosure, the polarization controller includes a polarization controller constructed based on at least one phase modulator and a Faraday rotator, or a polarization controller constructed based on a plurality of phase modulators, as shown in FIG. 4 and FIG. 5.

According to some embodiments of the present disclosure, the target transmittance matrix is generated as follows, which includes steps 11 to 17.

In step 11, for the $i^{th}$ sub-period, when the polarization controller works under the initial transmittance matrix including a plurality of first initial sub-parameters, if the bit error rate parameter meets the preset bit error rate threshold, the first parameter value of the $i^{th}$ sub-period is generated based on the coincidence count rate and the two detection response rates.

In step 12, the plurality of first initial sub-parameters of the polarization controller are adjusted to obtain the first transmittance matrix including a plurality of first sub-parameters.

In step 13, when the polarization controller works under the first transmittance matrix, the second parameter value of the $(i+1)^{th}$ sub-period is generated based on a coincidence count rate and detection response rates respectively corresponding to different single-photon detectors in the $(i+1)^{th}$ sub-period.

In step 14, a secondary adjustment is performed on the plurality of first initial sub-parameters of the polarization controller to obtain the second transmittance matrix including a plurality of second sub-parameters.

In step 15, when the polarization controller works under the second transmittance matrix, the third parameter value of the $(i+2)^{th}$ sub-period is generated based on the coincidence count rate and the detection response rates respectively corresponding to different single-photon detectors in the $(i+2)^{th}$ sub-period.

In step 16, a third variable value and a fourth variable value are generated based on the first parameter value, the second parameter value, and the third parameter value.

In step 17, a plurality of target sub-parameters of the target transmittance matrix for the $(i+1)^{th}$ period are generated based on the third variable value, the fourth variable value, and the initial transmittance matrix.

According to some alternative embodiments of the present disclosure, when the polarization controller is provided in the sending terminal or the polarization controller is provided in the receiving terminal, the polarization controller is a polarization controller including a Faraday rotator and at least one phase modulator, as shown in FIG. 4. The polarization controller is composed of phase modulators, polarization controllers, circulators and a Faraday rotator. PM is the phase modulator, PBS is the polarization controller, and CIR is the circulator. The phases of the two phase modulators PM are adjusted to $\varphi_1$ and $\varphi_2$ respectively. The specific implementation steps of the polarization correction by the polarization controller are as follows, which includes steps 21 to 27.

In step 21, the first initial sub-parameters of the initial transmittance matrix U of the polarization controller are recorded as $\varphi'_1$, $\varphi'_2$ and $\theta'$, and the polarization controller maintains this initial transmittance matrix U. While the QKD process is normally performed, the system response rates are monitored with 500 responses as the $i^{th}$ sub-period, until the bit error rate parameter meets the bit error rate threshold, that is, formula (5) is met, and the first parameter value $\delta_1$ for the $i^{th}$ sub-period is recorded.

In step 22, the first initial sub-parameters $\Phi'_1$, $\varphi'_2$ and $\theta'$ are adjusted to obtain a first transmittance matrix $UU_1$ including a plurality of first sub-parameters $\varphi_1$, $\varphi_2$ and $\theta$. The polarization controller works under the first transmittance matrix $UU_1$, which may be expressed by formulas (9), (10), (11), where i is an imaginary unit.

$$\varphi_1 = \arg\left(-\sin(\theta')\cos\left(-\frac{\pi}{4}\right) - \cos(\theta')\sin\left(-\frac{\pi}{4}\right)e^{\varphi'_1}\right) \quad (9)$$
$$-\arg\left(\cos(\theta')\cos\left(-\frac{\pi}{4}\right)\right)$$
$$-\sin(\theta')\sin\left(-\frac{\pi}{4}\right)e^{\varphi'_1}\right)$$

$$\varphi_2 = \arg\left(\cos(\theta')\sin\left(-\frac{\pi}{4}\right) + \sin(\theta')\cos\left(-\frac{\pi}{4}\right)e^{\varphi'_1}\right) \quad (10)$$
$$-\arg\left(\cos(\theta')\cos\left(-\frac{\pi}{4}\right)\right)$$
$$-\sin(\theta')\sin\left(-\frac{\pi}{4}\right)e^{\varphi'_1}\right) + \varphi'_2$$

$$\theta = \arccos\left(\left|\cos(\theta')\cos\left(-\frac{\pi}{4}\right) - \sin(\theta')\sin\left(-\frac{\pi}{4}\right)e^{\varphi'_1}\right|\right) \quad (11)$$

In Step 23, while the QKD process is normally performed, the data of 500 responses in the $(i+1)^{th}$ sub-period is recorded and the second parameter value $\delta_2$ of the $(i+1)^{th}$ sub-period is calculated.

In step 24, a second adjustment is performed on the first initial sub-parameters $\varphi'_1$, $\varphi'_2$ and $\theta'$ to obtain the second transmittance matrix $UU_2$ including a plurality of second sub-parameters $\varphi_1$, $\varphi_2$ and $\theta$. The polarization controller works under the second transmittance matrix $UU_2$, which may be expressed by formulas (12), (13), (14), where i is an imaginary unit.

$$\varphi_1 = \arg\left(-\sin(\theta')\cos\left(\frac{\pi}{4}\right) - \cos(\theta')\sin\left(\frac{\pi}{4}\right)e^{i(\varphi'_1-\frac{\pi}{2})}\right) - \quad (12)$$
$$\arg\left(\cos(\theta')\cos\left(\frac{\pi}{4}\right) - \sin(\theta')\sin\left(\frac{\pi}{4}\right)e^{i(\varphi'_1-\frac{\pi}{2})}\right) + \frac{\pi}{2}$$

$$\varphi_2 = \arg\left(\cos(\theta')\sin\left(\frac{\pi}{4}\right) + \sin(\theta')\cos\left(\frac{\pi}{4}\right)e^{i(\varphi'_1-\frac{\pi}{2})}\right) - \quad (13)$$
$$\arg\left(\cos(\theta')\cos\left(\frac{\pi}{4}\right) - \sin(\theta')\sin\left(\frac{\pi}{4}\right)e^{i(\varphi'_1-\frac{\pi}{2})}\right) + \varphi'_2$$

$$\theta = \arccos\left(\left|\cos(\theta')\cos\left(\frac{\pi}{4}\right) - \sin(\theta')\sin\left(\frac{\pi}{4}\right)e^{i(\varphi'_1-\frac{\pi}{2})}\right|\right) \quad (14)$$

In step 25, while the QKD process is normally performed, the data of 500 responses in the $(i+2)^{th}$ sub-period is recorded and the third parameter value $\delta_3$ of the $(i+2)^{th}$ sub-period is calculated.

In step 26, the third variable value $\theta_{fin}$ and the fourth variable value $\theta_{fin}$ are generated based on the first parameter value $\delta_1$, the second parameter value $\delta_2$ and the third parameter value $\delta_3$ which may be expressed by formulas (15) and (16).

$$\theta_{fin} = \arccos(\sqrt{\delta_1})\theta_{fin} \in \left[0, \frac{\pi}{2}\right] \quad (15)$$

$$\varphi_{fin} = \begin{cases} \arcsin\left(\frac{1-2\delta_3}{2\sqrt{\delta_1}\sqrt{1-\delta_1}}\right), & |1-2\delta_3| < 2\delta_2 - 1 \\ \arccos\left(\frac{2\delta_2-1}{2\sqrt{\delta_1}\sqrt{1-\delta_1}}\right), & |2\delta_2-1| < 1 - 2\delta_3 \\ \pi - \arcsin\left(\frac{1-2\delta_3}{2\sqrt{\delta_1}\sqrt{1-\delta_1}}\right), & |1-2\delta_3| < 1 - 2\delta_2 \\ 2\pi - \arccos\left(\frac{2\delta_2-1}{2\sqrt{\delta_1}\sqrt{1-\delta_1}}\right), & |\delta_2-1| < 2\delta_3 - 1 \end{cases} \quad (16)$$

In step 27, the target transmittance matrix of the polarization modulation that the polarization controller is going to perform finally is calculated based on the third variable value $\theta_{fin}$, the fourth variable value $\varphi_{fin}$ and the initial transmittance matrix U, which may be expressed as formulas (17), (18) and (19), where i is an imaginary unit.

$$\varphi_1 = \arg(-\sin(\theta')\cos(\theta_{fin}) - \cos(\theta')\sin(\theta_{fin})e^{i(\varphi_1'+\varphi_{fin})}) - \arg(\cos(\theta')\cos(\theta_{fin}) - \sin(\theta')\sin(\theta_{fin})e^{i(\varphi_1'+\varphi_{fin})}) \quad (17)$$

$$\varphi_2 = \arg(\cos(\theta')\sin(\theta_{fin}) + \sin(\theta')\cos(\theta_{fin})e^{i(\varphi_1'+\varphi_{fin})}) - \arg(\cos(\theta')\cos(\theta_{fin}) - \sin(\theta')\sin(\theta_{fin})e^{i(\varphi_1'+\varphi_{fin})}) + \varphi_2' \quad (18)$$

$$\theta = \arccos(|\cos(\theta')\cos(\theta_{fin}) - \sin(\theta')\sin(\theta_{fin})e^{i(\varphi_1'+\varphi_{fin})}|) \quad (19)$$

In this way, the polarization correction is completed, and when the polarization controller 10 performs this modulation, the polarization arriving at the measurement terminal is the same. After step 27 is performed, return to step 21.

According to some alternative embodiments of the present disclosure, when the polarization controller is provided in the sending terminal or the polarization controller is provided in the receiving terminal, the polarization controller is a polarization controller including a plurality of phase modulators. As shown in FIG. 5, the polarization controller is composed of phase modulators, polarization controllers, circulators and fixed polarization controllers. PM is the phase modulator, PBS is the polarization controller, CIR is the circulator, and $PC_1$ and $PC_2$ are fixed polarization controllers for Jones matrices. The phases of the three phase modulators PM are adjusted to $\varphi_1$, $\varphi_2$ and $\varphi_3$ respectively, and the Jones matrices of $PC_1$ and $PC_2$ are fixed to $$\frac{\sqrt{2}}{2}\begin{bmatrix} 1 & 1 \\ -1 & 1 \end{bmatrix} \text{ and } \frac{\sqrt{2}}{2}\begin{bmatrix} 1 & -1 \\ 1 & 1 \end{bmatrix}$$

respectively. Using this polarization controller, for timestamp-phase coded MDI-QKD, the method is specifically implemented as follows, which includes steps 31 to 37.

In step 31, the first initial sub-parameters of the initial transmittance matrix U of the polarization controller are recorded as $\varphi'_1$, $\varphi'_2$ and $\varphi'_3$, and the polarization controller maintains this initial transmittance matrix U. While the QKD process is normally performed, the system response rates are monitored with 500 responses as the $i^{th}$ sub-period, until the bit error rate parameter meets the bit error rate threshold, that is, formula (5) is met, and the first parameter value $\delta_1$ for the $i^{th}$ sub-period is recorded.

In step 32, the first initial sub-parameters $\varphi'_1$, $\varphi'_2$ and $\varphi'_3$ are adjusted to obtain the first transmittance matrix $UU_1$ including a plurality of first sub-parameters $\varphi_1$, $\varphi_2$ and $\varphi_3$. The polarization controller works under the first transmittance matrix $UU_1$, which may be expressed by formulas (20), (21) and (22), where i is an imaginary unit.

$$\varphi_1 = \arg\left(-\sin\left(\frac{\varphi_3'}{2}\right)\cos\left(-\frac{\pi}{4}\right) - \cos\left(\frac{\varphi_3'}{2}\right)\sin\left(-\frac{\pi}{4}\right)e^{i\varphi_1'}\right) - \tag{20}$$

$$\arg\left(\cos\left(\frac{\varphi_3'}{2}\right)\cos\left(-\frac{\pi}{4}\right) - \sin\left(\frac{\varphi_3'}{2}\right)\sin\left(-\frac{\pi}{4}\right)e^{i\varphi_1'}\right) + \frac{\pi}{2}$$

$$\varphi_2 = \arg\left(\cos\left(\frac{\varphi_3'}{2}\right)\sin\left(-\frac{\pi}{4}\right) + \sin\left(\frac{\varphi_3'}{2}\right)\cos\left(-\frac{\pi}{4}\right)e^{i\varphi_1'}\right) - \tag{21}$$

$$\arg\left(\cos\left(\frac{\varphi_3'}{2}\right)\cos\left(-\frac{\pi}{4}\right) - \sin\left(\frac{\varphi_3'}{2}\right)\sin\left(-\frac{\pi}{4}\right)e^{i\varphi_1'}\right) + \varphi_2' - \frac{\pi}{2}$$

$$\varphi_3 = 2\arccos\left(\left|\cos\left(\frac{\varphi_3'}{2}\right)\cos\left(-\frac{\pi}{4}\right) - \sin\left(\frac{\varphi_3'}{2}\right)\sin\left(-\frac{\pi}{4}\right)e^{i\varphi_1'}\right|\right) \tag{22}$$

In step 33, while the QKD process is normally performed, the data of 500 responses in the $(i+1)^{th}$ sub-period is recorded and the second parameter value $\delta_2$ of the $(i+1)^{th}$ sub-period is calculated.

In step 34, a second adjustment is performed on the first initial sub-parameters $\varphi'_1$, $\varphi'_2$ and $\varphi'_3$ to obtain the second transmittance matrix $UU_2$ including a plurality of first sub-parameters $\varphi_1$, $\varphi_2$ and $\varphi_3$. The polarization controller works under the second transmittance matrix $UU_2$, which may be expressed by formulas (23), (24), (25), where i is an imaginary unit.

$$\varphi_1 = \arg\left(-\sin\left(\frac{\varphi_3'}{2}\right)\cos\left(\frac{\pi}{4}\right) - \cos\left(\frac{\varphi_3'}{2}\right)\sin\left(\frac{\pi}{4}\right)e^{i(\varphi_1' - \frac{\pi}{2})}\right) - \tag{23}$$

$$\arg\left(\cos\left(\frac{\varphi_3'}{2}\right)\cos\left(\frac{\pi}{4}\right) - \sin\left(\frac{\varphi_3'}{2}\right)\sin\left(\frac{\pi}{4}\right)e^{i(\varphi_1' - \frac{\pi}{2})}\right) + \frac{\pi}{2} + \frac{\pi}{2}$$

$$\varphi_2 = \arg\left(\cos\left(\frac{\varphi_3'}{2}\right)\sin\left(\frac{\pi}{4}\right) + \sin\left(\frac{\varphi_3'}{2}\right)\cos\left(\frac{\pi}{4}\right)e^{i(\varphi_1' - \frac{\pi}{2})}\right) - \tag{24}$$

$$\arg\left(\cos\left(\frac{\varphi_3'}{2}\right)\cos\left(\frac{\pi}{4}\right) - \sin\left(\frac{\varphi_3'}{2}\right)\sin\left(\frac{\pi}{4}\right)e^{i(\varphi_1' - \frac{\pi}{2})}\right) + \varphi_2' - \frac{\pi}{2}$$

$$\varphi_3 = 2\arccos\left(\left|\cos\left(\frac{\varphi_3'}{2}\right)\cos\left(\frac{\pi}{4}\right) - \sin\left(\frac{\varphi_3'}{2}\right)\sin\left(\frac{\pi}{4}\right)e^{i(\varphi_1' - \frac{\pi}{2})}\right|\right) \tag{25}$$

In step 35, while the QKD process is normally performed, the data of 500 responses in the $(i+2)^{th}$ sub-period is recorded. The third parameter value $\delta_3$ of the $(i+2)^{th}$ sub-period is calculated.

In step 36, the third variable value $\theta_{fin}$ and the fourth variable value $\theta_{fin}$ are calculated based on the first parameter value $\theta_1$, the second parameter value $\theta_2$ and the third parameter value $\delta_3$, which may be expressed by formulas (15) and (16).

In step 37, the target transmittance matrix of the polarization modulation that the polarization controller is going to perform finally is calculated based on the third variable value $\theta_{fin}$, the fourth variable value $\theta_{fin}$ and the initial transmittance matrix U, which may be expressed by formulas (26), (27) and (28), where i is an imaginary unit.

$$\varphi_1 = \arg\left(-\sin\left(\frac{\varphi_3'}{2}\right)\cos(\theta_{fin}) - \cos\left(\frac{\varphi_3'}{2}\right)\sin(\theta_{fin})e^{i(\varphi_1' + \varphi_{fin})}\right) - \tag{26}$$

$$\arg\left(\cos\left(\frac{\varphi_3'}{2}\right)\cos(\theta_{fin}) - \sin\left(\frac{\varphi_3'}{2}\right)\sin(\theta_{fin})e^{i(\varphi_1' + \varphi_{fin})}\right) + \frac{\pi}{2}$$

$$\varphi_2 = \arg\left(\cos\left(\frac{\varphi_3'}{2}\right)\sin(\theta_{fin}) + \sin\left(\frac{\varphi_3'}{2}\right)\cos(\theta_{fin})e^{i(\varphi_1' + \varphi_{fin})}\right) - \tag{27}$$

$$\arg\left(\cos\left(\frac{\varphi_3'}{2}\right)\cos(\theta_{fin}) - \sin\left(\frac{\varphi_3'}{2}\right)\sin(\theta_{fin})e^{i(\varphi_1' + \varphi_{fin})}\right) + \varphi_2' - \frac{\pi}{2}$$

$$\varphi_3 = 2\arccos\left(\left|\cos\left(\frac{\varphi_3'}{2}\right)\cos(\theta_{fin}) - \sin\left(\frac{\varphi_3'}{2}\right)\sin(\theta_{fin})e^{i(\varphi_1' + \varphi_{fin})}\right|\right) \tag{28}$$

In this way, the polarization correction is completed, and when the polarization controller performs this modulation, the polarization arriving at the measurement terminal is the same.

After step 37 is performed, return to step 31.

According to some embodiments of the present disclosure, when the polarization controllers are provided in the measurement terminal, each of an input terminal and an output terminal of a main component of the measurement terminal is connected to a respective one of the polarization controllers.

According to some embodiments of the present disclosure, the target transmittance matrix is generated by: obtaining a plurality of second target parameter values of the two polarization controllers working under different transmittance matrices in different sub-periods respectively, where the different transmittance matrices are determined based on initial transmittance matrices and preset Jones matrices; generating a plurality of intermediate parameters based on the plurality of second target parameter values; generating a plurality of target variable values and a target phase based on the plurality of intermediate parameters and the plurality of second target parameter values; and generating a target transmittance matrix for each of the two polarization controllers for an $(i+1)^{th}$ period based on the plurality of target variable values and the target phase.

According to some embodiments of the present disclosure, the polarization controller modulates the polarization of light by setting different transmittance matrices.

According to some embodiments of the present invention, different transmittance matrices are determined based on initial transmittance matrices and preset Jones matrices.

According to some embodiments of the present disclosure, a period represents a process of modulation that the polarization controller needs to perform to generate a target transmittance matrix from an initial transmittance matrix. A target transmittance matrix, to be executed by the polarization controller, generated in an $i^{th}$ period is an initial transmittance matrix to be executed by the polarization controller in an $(i+1)^{th}$ period. For example, a target transmittance matrix, to be executed by the polarization controller, generated in a first period is an initial transmittance matrix to be executed by the polarization controller in a second period; and a target transmittance matrix, to be executed by the polarization controller, generated in the second period is an initial transmittance matrix to be executed by the polarization controller in a third period.

According to some embodiments of the present disclosure, the $i^{th}$ period includes an $i^{th}$ sub-period, an $(i+1)^{th}$ sub-period, an $(i+2)^{th}$ sub-period, an $(i+3)^{th}$ sub-period, etc. For example, the first period includes a first sub-period, a second sub-period, a third sub-period, etc.

According to some embodiments of the present disclosure, the plurality of intermediate parameters are generated by a plurality of second target parameter values respectively, which may be expressed by formulas (29), (30), and (31). The plurality of target variable values are generated by the plurality of intermediate parameters respectively, which may be expressed by formulas (32), (33), and (34). The target phase is calculated according to the plurality of target variable values, which may be expressed by formula (35).

$$\chi_1 = \delta_1 + \delta_3 \tag{29}$$

$$\chi_2 = \delta_1 - \delta_3 \tag{30}$$

$$\chi_3 = 2\delta_2 - \chi_1 \tag{31}$$

$$\theta_a = \frac{\arccos\sqrt{\frac{\chi_1 - \sqrt{\chi_2^2 + \chi_3^2}}{2}} + \arccos\sqrt{\frac{\chi_1 + \sqrt{\chi_2^2 + \chi_3^2}}{2}}}{2} \tag{32}$$

$$\theta_b = \frac{\arccos\sqrt{\frac{\chi_1 - \sqrt{\chi_2^2 + \chi_3^2}}{2}} - \arccos\sqrt{\frac{\chi_1 + \sqrt{\chi_2^2 + \chi_3^2}}{2}}}{2} \tag{33}$$

$$\Delta = \arctan\frac{\chi_3}{\chi_2} \tag{34}$$

$$\phi = \frac{\sqrt{b^2 - 4a(c - \delta_4)} - b}{2a} \tag{35}$$

Figure 6:
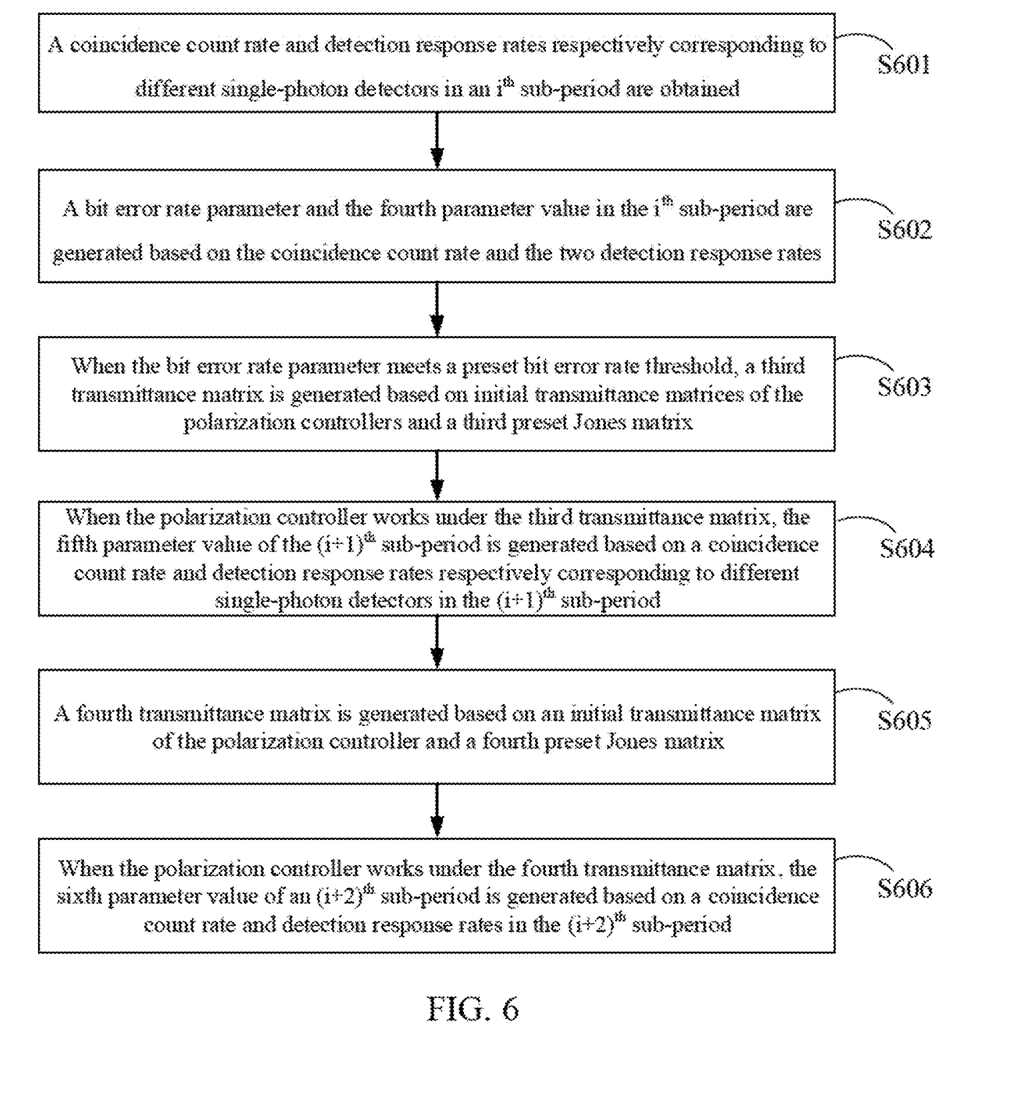
FIG. 6 shows a flow chart of obtaining second target parameter values by a quantum key distribution system according to another embodiment of the present disclosure.

FIG. 6 shows a flow chart of obtaining second target parameter values by a quantum key distribution system according to another embodiment of the present disclosure.

According to some embodiments of the present disclosure, the second target parameter values include a fourth parameter value, a fifth parameter value, and a sixth parameter value.

According to some embodiments of the present disclosure, obtaining the plurality of second target parameter values of each of the two polarization controllers working under different transmittance matrices in different sub-periods includes operations S601 to S606, as shown in FIG. 6.

According to some embodiments of the present disclosure, operation 601 includes: obtaining a coincidence count rate and detection response rates respectively corresponding to different single-photon detectors in the $i^{th}$ sub-period.

According to some embodiments of the present disclosure, operation 602 includes: generating a bit error rate parameter and the fourth parameter value in the $i^{th}$ sub-period based on the coincidence count rate and the two detection response rates.

According to some embodiments of the present disclosure, operation S603 includes: when the bit error rate parameter meets a preset bit error rate threshold, generating a third transmittance matrix for a polarization controller based on initial transmittance matrices of the two polarization controllers and a third preset Jones matrix.

According to some embodiments of the present disclosure, operation 604 includes: when the polarization controller works under the third transmittance matrix, generating the fifth parameter value of the $(i+1)^{th}$ sub-period based on a coincidence count rate and detection response rates respectively corresponding to different single-photon detectors in the $(i+1)^{th}$ sub-period.

According to some embodiments of the present disclosure, operation 605 includes: generating a fourth transmittance matrix for the polarization controller based on an initial transmittance matrix of the polarization controller and a fourth preset Jones matrix.

According to some embodiments of the present disclosure, operation 606 includes: when the polarization controller works under the fourth transmittance matrix, generating the sixth parameter value of the $(i+2)^{th}$ sub-period based on a coincidence count rate and detection response rates in the $(i+2)^{th}$ sub-period.

According to some alternative embodiments of the present disclosure, when the polarization controller is provided in the measurement terminal, the specific implementation steps are as follows, which includes operations S601 to S606.

For ease of description, the first preset Jones matrix $U_1$ and the second preset Jones matrix $U_2$ to be executed by the polarization controllers are respectively recorded by formulas (36) and (37), where i is an imaginary unit.

$$U_1 = \begin{bmatrix} 1 & 0 \\ 0 & i \end{bmatrix} \tag{36}$$

$$U_2 = \begin{bmatrix} 1 & 0 \\ 0 & -1 \end{bmatrix} \tag{37}$$

In operation 601, for each data collection process, single detector response rates $D_1$ and $D_2$ of the two long arms of the detector terminal and a corresponding coincidence count rate $Q_{12}$ in the $i^{th}$ sub-period are recorded.

In operation 602, the initial transmittance matrices modulated by the polarization controllers before performing this step are recorded as $U'$ and $U''$. The polarization controllers maintain the modulated initial transmittance matrices $U'$ and $U''$. While the QKD process is normally performed, the system response rates $D_1$ and $D_2$ are monitored with N responses as the $i^{th}$ sub-period, until the bit error rate parameter meets the preset bit error rate threshold, as shown by formula (5), and the fourth parameter value $\delta_1$ at this time is recorded.

In operation 603, when the bit error rate parameter meets the preset bit error rate threshold, a third transmittance matrix $U_1U'$ is generated based on the initial transmittance matrix $U'$ of the polarization controller and a third preset Jones matrix $U_1$.

In operation 604, when the polarization controller works under the third transmittance matrix $UU_1$ and the modulation of the other polarization controller remains unchanged, while the QKD process is normally performed, data of N responses in the $(i+1)^{th}$ sub-period is recorded, and the fifth parameter value $\delta_2$ at this time is calculated.

In operation 605, when the bit error rate parameter meets the preset bit error rate threshold, the fourth transmittance matrix $U_2U'$ is generated based on the initial transmittance matrix $U'$ of the polarization controller and a fourth preset Jones matrix $U_2$.

In operation 606, when the polarization controller works under the fourth transmittance matrix $U_2U'$, while the QKD process is normally performed, data of N responses in the $(i+2)^{th}$ sub-period is recorded, and the sixth parameter value $\delta_3$ at this time is calculated.

According to some embodiments of the present disclosure, the target variable values include a fifth variable value, a sixth variable value, and a seventh variable value.

According to some embodiments of the present disclosure, generating the plurality of target variable values and the target phase based on the plurality of intermediate parameters and the plurality of second target parameter values includes: generating the fifth variable value, the sixth variable value and the seventh variable value based on the plurality of the intermediate parameters; obtaining a fifth transmittance matrix for each of the two polarization controllers based on the fifth variable value, the sixth variable value and the seventh variable value; when the two polarization controllers each work under a respective fifth transmittance matrix, generating a seventh parameter value of an $(i+3)^{th}$ sub-period based on a coincidence count rate and detection response rates in the $(i+3)^{th}$ sub-period, where the $i^{th}$ period includes the $i^{th}$ sub-period, the $(i+1)^{th}$ sub-period, the $(i+2)^{th}$ sub-period, and the $(i+3)^{th}$ sub-period; and generating the target phase based on the fifth variable value, the sixth variable value and the seventh parameter value.

According to some embodiments of the present disclosure, the plurality of obtained second target parameter values, i.e., the fourth parameter value $\delta_1$, the fifth parameter value $\delta_2$ and the sixth parameter value $\delta_3$, are substituted into formulas (29), (30) and (31) to calculate the plurality of intermediate parameters $\chi_1$, $\chi_2$ and $\chi_3$; then, the plurality of calculated intermediate parameter values are substituted into formulas (32), (33), and (34) to calculate the plurality of target variable values $\theta_a$, $\theta_b$ and $\Delta$; and the plurality of target variable values are substituted into formula (35) to calculate the target phase $\phi$.

According to some embodiments of the present disclosure, the target variable values include a fifth variable value, a sixth variable value, and a seventh variable value.

According to some embodiments of the present disclosure, generating the target transmittance matrix for each of the two polarization controllers for the $(i+1)^{th}$ period based on plurality of target variable values and the target phase includes: generating the target transmittance matrix for each of the two polarization controllers for the $(i+1)^{th}$ period based on the fifth variable value, the sixth variable value, the seventh variable value and the target phase.

According to some embodiments of the present disclosure, obtaining the fifth transmittance matrix for each of the two polarization controllers based on the fifth variable value $\theta_a$, the sixth variable value $\theta_b$ and the seventh variable value $\Delta$ may be expressed by formulas (38) and (39) respectively, where i is an imaginary unit.

$$\begin{bmatrix} \cos(\theta_a) & \sin(\theta_a) \\ -\sin(\theta_a) & \cos(\theta_a) \end{bmatrix} U^I \quad (38)$$

$$\begin{bmatrix} \cos(\theta_b) & \sin(\theta_b) \\ -\sin(\theta_b) & \cos(\theta_b) \end{bmatrix} \begin{bmatrix} 1 & 0 \\ 0 & e^{-i\Delta} \end{bmatrix} U^{II} \quad (39)$$

According to some embodiments of the present disclosure, when the two polarization controllers work under their respective fifth transmittance matrices, data of N responses in the $(i+3)^{th}$ sub-period is recorded, and the seventh parameter value $\delta_4$ at this time is calculated.

According to some embodiments of the present disclosure, the target phase $\phi$ is calculated based on the fifth variable value $\theta_a$, the sixth variable value $\theta_b$, and the seventh parameter value $\delta_4$.

According to some embodiments of the present disclosure, obtaining the target transmittance matrices for the polarization finally performed by the polarization controllers based on the plurality of target variable values, i.e. the fifth variable value $\theta_a$, the sixth variable value $\theta_b$, the seventh variable value $\Delta$ and the target phase $\phi$, may be expressed by formulas (40) and (41), where i is an imaginary unit. In this way, the polarization correction is completed, and when each of the two polarization controllers performs such modulation, the polarization arriving at the measurement terminal is the same.

$$U_{final}^I = \begin{bmatrix} \cos(\theta_a) & \sin(\theta_a) \\ -\sin(\theta_a) & \cos(\theta_a) \end{bmatrix} \begin{bmatrix} 1 & 0 \\ 0 & e^{-i\phi} \end{bmatrix} U^I \quad (40)$$

-continued $$U_{final}^{II} = \begin{bmatrix} \cos(\theta_b) & \sin(\theta_b) \\ -\sin(\theta_b) & \cos(\theta_b) \end{bmatrix} \begin{bmatrix} 1 & 0 \\ 0 & e^{-i(\Delta+\phi)} \end{bmatrix} U^{II} \quad (41)$$

In this way, the polarization correction is completed, and when each of the two polarization controllers performs such modulation, the polarization arriving at the measurement terminal is the same.

According to some embodiments of the present disclosure, the target transmittance matrices $U_{final}^I$ and $U_{final}^{II}$ may serve as the initial transmittance matrices of the $(i+1)^{th}$ period, and operations S601 to S606 are repeated again.

FIG. 4 shows a schematic structural diagram of a polarization controller constructed based on at least one phase modulator and a Faraday rotator according to an embodiment of the present disclosure. FIG. 5 shows a schematic structural diagram of a polarization controller constructed based on a plurality of phase modulators according to an embodiment of the present disclosure.

According to some embodiments of the present disclosure, the polarization controller includes a polarization controller constructed based on at least one phase modulator and a Faraday rotator, or a polarization controller constructed based on a plurality of phase modulators, as shown in FIG. 4 and FIG. 5.

According to some embodiments of the present disclosure, the target transmittance matrices are generated as follows, which includes steps 401 to 410.

In step 401, for the $i^{th}$ sub-period, when each of the two polarization controllers works under an initial transmittance matrix including a plurality of second initial sub-parameters, if the bit error rate parameter meets the preset bit error rate threshold, the fourth parameter value of the $i^{th}$ sub-period is generated based on the coincidence count rate and the two detection response rates. In step 402, the plurality of second initial sub-parameters of a polarization controller are adjusted to obtain the third transmittance matrix including a plurality of third sub-parameters.

In step 403, when the polarization controller works under the third transmittance matrix, the fifth parameter value of the $(i+1)^{th}$ sub-period is generated based on the coincidence count rate and the detection response rates respectively corresponding to different single-photon detectors in the $(i+1)^{th}$ sub-period.

In step 404, a secondary adjustment is performed on the plurality of second initial sub-parameters of the polarization controller to obtain the fourth transmittance matrix including a plurality of fourth sub-parameters.

In step 405, when the polarization controller works under the fourth transmittance matrix, the sixth parameter value of the $(i+2)^{th}$ sub-period is generated based on the coincidence count rate and the detection response rates respectively corresponding to different single-photon detectors in the $(i+2)^{th}$ sub-period.

In step 406, the plurality of intermediate parameters are generated based on the fourth parameter value, the fifth parameter value, and the sixth parameter value.

In step 407, the fifth variable value, the sixth variable value and the seventh variable value are generated based on the plurality of the intermediate parameters.

In step 408, the fifth transmittance matrix for each of the two polarization controllers is obtained based on the fifth variable value, the sixth variable value and the seventh variable value, and when the two polarization controllers each work under a respective fifth transmittance matrix, a seventh parameter value of the $(i+3)^{th}$ sub-period is generated based on the coincidence count rate and the detection response rates in the $(i+3)^{th}$ sub-period, where the $i^{th}$ period includes the $i^{th}$ sub-period, the $(i+1)^{th}$ sub-period, the $(i+2)^{th}$ sub-period, and the $(i+3)^{th}$ sub-period.

In step 409, the target phase is generated based on the fifth variable value, the sixth variable value, and the seventh parameter value.

In step 410, the target transmittance matrix for each of the two polarization controllers for the $(i+1)^{th}$ period is generated based on the fifth variable value, the sixth variable value, the seventh variable value, and the target phase.

According to some alternative embodiments, when the polarization controller is provided in the measurement terminal, the polarization controller is a polarization controller including both a Faraday rotator and at least one phase modulator, as shown in FIG. 4. The polarization controller is composed of phase modulators, polarization controllers, circulators and a Faraday rotator. PM is the phase modulator, PBS is the polarization controller, and CIR is the circulator. The phases of the two phase modulators PM are adjusted to $\varphi_1$ and $\varphi_2$ respectively. The specific implementation steps of the polarization correction by the polarization controllers are as follows, which includes steps 501 to 510.

In step 501, in the $i^{th}$ sub-period, when the two polarization controllers work under an initial transmittance matrix with second initial sub-parameters $\varphi_1'$, $\varphi_2'$ and $\theta'$ and an initial transmittance matrix with second initial sub-parameters $\varphi_1''$, $\varphi_2''$ and $\theta''$ respectively, while the QKD process is normally performed, the system response rates are monitored with 500 responses as the $i^{th}$ sub-period, until the bit error rate parameter meets the bit error rate threshold, that is, formula (5) is met, and the fourth parameter value $\delta_1$ for the $i^{th}$ sub-period is recorded.

In step 502, the plurality of second initial sub-parameters $\varphi_1'$, $\varphi_2'$ and $\theta'$ of the polarization controller 1 are adjusted to obtain the third transmittance matrix including a plurality of third sub-parameters, which may be expressed by formulas (42), (43) and (44). The modulation of the polarization controller 2 remains unchanged, which may be expressed by formulas (45), (46) and (47).

$$\varphi_1^I = \varphi_1' \tag{42}$$

$$\varphi_2^I = \varphi_2' + \frac{\pi}{2} \tag{43}$$

$$\theta^I = \theta' \tag{44}$$

$$\varphi_1^{II} = \varphi_1'' \tag{45}$$

$$\varphi_2^{II} = \varphi_2'' \tag{46}$$

$$\theta^{II} = \theta'' \tag{47}$$

In step 503, while the QKD process is normally performed, the data of 500 responses in the $(i+1)^{th}$ sub-period is recorded and the fifth parameter value $\delta_2$ of the $(i+1)^{th}$ sub-period is calculated.

In step 504, a second adjustment is performed on the plurality of second initial sub-parameters $\varphi_1'$, $\varphi_2'$ and $\theta'$ of the polarization controller 1 to obtain the fourth transmittance matrix including a plurality of fourth sub-parameters, where $\varphi_1'$ and $\theta'$ may be still expressed by formulas (42) and (44), and $\varphi_2'$ is adjusted and may be expressed by formula (48). The modulation of the polarization controller 2 remains unchanged, which is still expressed by formulas (45), (46) and (47).

$$\varphi_2' = \varphi_2' + \pi \tag{48}$$

In step 505, while the QKD process is normally performed, the data of 500 responses in the $(i+2)^{th}$ sub-period is recorded, and the sixth parameter value $\delta_3$ of the $(i+2)^{th}$ sub-period is calculated.

In step 506, the plurality of intermediate parameters are calculated based on the fourth parameter value $\delta_1$, the fifth parameter value $\delta_2$, and the sixth parameter value $\delta_3$.

In step 507, the fifth variable value $\theta_a$, the sixth variable value $\theta_b$, and the seventh variable value $\Delta$ are calculated based on the plurality of intermediate parameters.

In step 508, a third adjustment is performed on the plurality of second initial sub-parameters $\varphi_1'$, $\varphi_2'$ and $\theta'$ of the polarization controller 1 to obtain a fifth transmittance matrix including a plurality of fifth sub-parameters, where $\varphi_1'$ is still expressed by formula (42), and $\varphi_2'$ and $\theta'$ are adjusted and may be expressed by formulas (49) and (50). The plurality of second initial sub-parameters, $\varphi_1'''$, $\varphi_2'''$ and $\theta'''$ of the polarization controller 2 are adjusted to obtain a fifth transmittance matrix including a plurality of fifth sub-parameters, which may be expressed by formulas (51), (52) and (53), where i is an imaginary unit. When the two polarization controllers work under their respective fifth transmittance matrices, data of 500 responses in the $(i+3)^{th}$ sub-period is recorded, and the seventh parameter value $\delta_4$ at this time is calculated.

$$\varphi_2' = \varphi_2' \tag{49}$$

$$\theta' = \theta' + \theta_a \tag{50}$$

$$\varphi_1'' = \arg(-\sin(\theta_b)\cos(\theta'') - \cos(\theta_b)\sin(\theta'')e^{i(-\Delta + \varphi_2'')}) - \arg(\cos(\theta_b)\cos(\theta'') - \sin(\theta_b)\sin(\theta'')e^{i(-\Delta + \varphi_2'')}) + \varphi_1'' \tag{51}$$

$$\varphi_2'' = \arg(\cos(\theta_b)\sin(\theta'') + \sin(\theta_b)\cos(\theta'')e^{i(-\Delta + \varphi_2'')}) - \arg(\cos(\theta_b)\cos(\theta'') - \sin(\theta_b)\sin(\theta'')e^{i(-\Delta + \varphi_2'')}) \tag{52}$$

$$\theta'' = \arccos(|\cos(\theta_b)\cos(\theta'')^{-\sin(\theta_b)}\sin(\theta'')e^{i(-\Delta + \varphi_2'')}|) \tag{53}$$

In step 509, three intermediate variables are calculated based on the fifth variable value $\theta_a$, the sixth variable value $\theta_b$ and the seventh parameter value $\delta_4$, which may be expressed by formulas (54), (55) and (56). Then, the target phase $\phi$ is calculated, which may be expressed by formula (57).

$$a = \sin\left(\frac{\theta_a - \theta_b}{2}\right)^4 - \sin\left(\frac{\theta_a + \theta_b}{2}\right)^2 \sin\left(\frac{\theta_a - \theta_b}{2}\right)^2 \tag{54}$$

$$b = 2\sin\left(\frac{\theta_a - \theta_b}{2}\right)^2 \cos\left(\frac{\theta_a - \theta_b}{2}\right)^2 \tag{55}$$

$$c = \cos\left(\frac{\theta_a - \theta_b}{2}\right)^4 - \sin\left(\frac{\theta_a + \theta_b}{2}\right)^2 \sin\left(\frac{\theta_a - \theta_b}{2}\right)^2 \tag{56}$$

$$\phi = \frac{\sqrt{b^2 - 4a(c - \delta_4)} - b}{2a} \tag{57}$$

In step 510, the target transmittance matrices for polarization finally performed by the two polarization controllers are calculated based on the fifth variable value $\theta_a$, the sixth variable value $\theta_b$, the seventh variable value $\Delta$ and the target phase $\phi$, which may be respectively expressed by formulas (58), (59) and (60), and formulas (61), (62) and (63), where i is an imaginary unit.

$$\varphi_1' = \arg(-\sin(\theta_a)\cos(\theta') - \cos(\theta_a)\sin(\theta')e^{i(-\phi + \varphi_2'')}) - \arg(\cos(\theta_a)\cos(\theta') - \sin(\theta_a)\sin(\theta')e^{i(-\phi + \varphi_2'')}) + \varphi_1' \tag{58}$$

$$\varphi_2' = \arg(\cos(\theta_a)\sin(\theta') + \sin(\theta_a)\cos(\theta')e^{i(-\phi + \varphi_2'')}) - \arg(\cos(\theta_a)\cos(\theta') - \sin(\theta_a)\sin(\theta')e^{i(-\phi + \varphi_2'')}) \tag{59}$$

$\theta'=\arccos(|\cos(\theta_a)\cos(\theta')-\sin(\theta_a)\sin(\theta')e^{i(-\phi+\varphi_2'')}|)$ (60)

$\varphi_1''=\arg(-\sin(\theta_b)\cos(\theta''')-\cos(\theta_b)\sin(\theta''')$
$e^{i(-(\Delta+\phi)+\varphi_2''')})-\arg(\cos(\theta_b)\cos(\theta'''-\sin(\theta_b)\sin(\theta''')$
$e^{i(-(\Delta+\phi)+\varphi_2''')})+\varphi_1''$ (61)

$\varphi_2''=\arg(\cos(\theta_b)\sin(\theta''')+\sin(\theta_b)\cos(\theta''')$
$e^{i(-(\Delta+\phi)+\varphi_2''')})-\arg(\cos(\theta_b)\cos(\theta''')-\sin(\theta_b)\sin$
$(\theta''')e^{i(-(\Delta+\phi)+\varphi_2''')})$ (62)

$\theta''=\arccos(|\cos(\theta_b)\cos(\theta''')-\sin(\theta_b)\sin(\theta''')$
$e^{i(-(\Delta+\phi)+\varphi_2''')}|)$ (63)

In this way, the polarization correction is completed, and when each of the two polarization controllers performs such modulation, the polarization arriving at the measurement terminal is the same.

After step 510 is performed, return to step 501.

According to some alternative embodiments of the present disclosure, when the polarization controller is provided in the measurement terminal, the polarization controller is the polarization controller including a plurality of phase modulators, as shown in FIG. 5. This polarization controller is composed of phase modulators, polarization controllers, circulators and fixed polarization controllers. PM is the phase modulator, PBS is the polarization controller, CIR is the circulator, and $PC_1$ and $PC_2$ are fixed polarization controllers for Jones matrices. The phases of the three phase modulators PM are adjusted to $\varphi_1$, $\varphi_2$ and $\varphi_3$ respectively, and the Jones matrices of $PC_1$ and $PC_2$ are fixed to $$\frac{\sqrt{2}}{2}\begin{bmatrix} 1 & 1 \\ -1 & 1 \end{bmatrix} \text{ and } \frac{\sqrt{2}}{2}\begin{bmatrix} 1 & -1 \\ 1 & 1 \end{bmatrix}$$

respectively. Using this polarization controller, for time-stamp-phase coded MDI-QKD, the method is specifically implemented as follows, which includes steps 601 to 610.

In step 601, when the two the polarization controllers work under an initial transmittance matrix with second initial sub-parameters $\varphi_1'$, $\varphi_2'$ and $\varphi_3'$ and an initial transmittance matrix with second initial sub-parameters $\varphi_1''$, $\varphi_2''$ and $\varphi_3''$ respectively, while the QKD process is normally performed, the response rates of the system are monitored with 500 responses as the $i^{th}$ sub-period, until the bit error rate parameter meets the bit error rate threshold, that is, formula (5) is met, and the fourth parameter value $\delta_1$ for the $i^{th}$ sub-period is recorded.

In step 602, the plurality of second initial sub-parameters $\varphi_1'$, $\varphi_2'$ and $\varphi_3'$ of the polarization controller 1 are adjusted to obtain a third transmittance matrix including a plurality of third sub-parameters, which may be expressed by formulas (64), (65) and (66). The modulation of the polarization controller 2 remains unchanged, which may be expressed by formulas (67), (68) and (69).

$\varphi_1^I = \varphi_1^{I'}$ (64)

$\varphi_2^I = \varphi_2^{I'}$ (65)

$\varphi_3^I = \varphi_3^{I'} + \frac{\pi}{2}$ (66)

$\varphi_1'' = \varphi_1''$ (67)

$\varphi_2'' = \varphi_2''$ (68)

$\varphi_3'' = \varphi_3''$ (69)

In step 603, while the QKD process is normally performed, the data of 500 responses in the $(i+1)^{th}$ sub-period is recorded, and the fifth parameter value $\delta_2$ of the $(i+1)^{th}$ sub-period is calculated.

In step 604, a second adjustment is performed on the plurality of second initial sub-parameters $\varphi_1'$, $\varphi_2'$ and $\varphi_3'$ of the polarization controller 1, where $\varphi_1'$ and $\varphi_2'$ are still expressed by formulas (64) and (65), and $\varphi_3'$ is adjusted and may be expressed by formula (70). The modulation of the polarization controller 2 remains unchanged, which is still expressed by formulas (67), (68) and (69).

$\varphi_3' = \varphi_3' + \pi$ (70)

In step 605, while the QKD process is normally performed, the data of 500 responses in the $(i+2)^{th}$ sub-period is recorded, and the sixth parameter value $\delta_3$ of the $(i+2)^{th}$ sub-period is calculated.

In step 606, the plurality of intermediate parameters are calculated based on the fourth parameter value $\delta_1$, the fifth parameter value $\delta_2$, and the sixth parameter value $\delta_3$.

In step 607, the fifth variable value $\theta_a$, the sixth variable value $\theta_b$, and the seventh variable value $\Delta$ are calculated based on the plurality of the intermediate parameters.

In step 608, a third adjustment is performed on the plurality of second initial sub-parameters $\varphi_1'$, $\varphi_2'$ and $\varphi_3'$ of the polarization controller 1, where $\varphi_1'$ is still expressed by formulas (64), and $\varphi_2'$ and $\varphi_3'$ are adjusted and may be expressed by formulas (71) and (72). The modulation of the polarization controller 2 may be expressed by formulas (73), (74) and (75), where i is an imaginary unit. While the QKD process is normally performed, the data of 500 responses in the $(i+3)^{th}$ sub-period is recorded, and a seven parameter value $\delta_4$ at this time is calculated.

$\varphi_2' = \varphi_2' + 2\theta_a$ (71)

$\varphi_3' = \varphi_3'$ (72)

$\varphi_1'' = \arg(-\sin(\theta_b)\cos(\theta''')-\cos(\theta_b)\sin(\theta''')e^{i(-\Delta+\varphi_2''')})-$
$\arg(\cos(\theta_b)\cos(\theta''')-\sin(\theta_b)\sin(\theta''')e^{i(-\Delta+\varphi_2''')})+$
$\varphi_1''$ (73)

$\varphi_2''=2\arccos(|\cos(\theta_b)\cos(\theta''')-\sin(\theta_b)\sin(\theta''')$
$e^{i(-\Delta+\varphi_2''')}|)$ (74)

$\varphi_3''=\arg(\cos(\theta_b)\sin(\theta''')+\sin(\theta_b)\cos(\theta''')e^{i(-\Delta+\varphi_2''')})-$
$\arg(\cos(\theta_b)\cos(\theta''')-\sin(\theta_b)\sin(\theta''')e^{i(-\Delta+\varphi_2''')})$ (75)

In step 609, three intermediate variables are calculated based on the fifth variable value $\theta_a$, the sixth variable value $\theta_b$, and the seventh parameter value $\delta_4$. Then, the target phase $\phi$ is calculated.

In step 610, the target transmittance matrices for polarization finally performed by the two polarization controllers are calculated based on the fifth variable value $\theta_a$, the sixth variable value $\theta_b$, the seventh variable value $\Delta$ and the target phase $\phi$, which may be respectively expressed by formulas (76), (77) and (78), and formulas (79), (80) and (81), where i is an imaginary unit.

$\varphi_1'=\arg(-\sin(\theta_a)\cos(\theta')-\cos(\theta_a)\sin(\theta')e^{i(-\phi+\varphi_2''')})-\arg$
$(\cos(\theta_a)\cos(\theta')-\sin(\theta_a)\sin(\theta')e^{i(-\phi+\varphi_2''')})+\varphi_1'$ (76)

$\varphi_2'=\arccos(|\cos(\theta_a)\cos(\theta')-\sin(\theta_a)\sin(\theta')e^{i(-\phi+\varphi_2''')}|)$ (77)

$\varphi_3'=\arg(\cos(\theta_a)\sin(\theta')+\sin(\theta_a)\cos(\theta')e^{i(-\phi+\varphi_2''')})-\arg$
$(\cos(\theta_a)\cos(\theta')-\sin(\theta_a)\sin(\theta')e^{i(-\phi+\varphi_2''')})$ (978)

$\varphi_1''=\arg(-\sin(\theta_b)\cos(\theta''')-\cos(\theta_b)\sin(\theta''')$
$e^{i(-(\Delta+\phi)+\varphi_2''')})-\arg(\cos(\theta_b)\cos(\theta''')-\sin(\theta_b)\sin$
$(\theta''')e^{i(-(\Delta+\phi)+\varphi_2''')})+\varphi_1''$ (79)

$$\varphi_2{}^H = \arccos(|\cos(\theta_b)\cos(\theta^{H'}) - \sin(\theta_b)\sin(\theta^{H'})$$
$$e^{i(-(\Delta+\phi)+\varphi_2{}^{H'})}|) \qquad (80)$$

$$\varphi_3{}^H = \arg(\cos(\theta_b)\sin(\theta^{H'}) + \sin(\theta_b)\cos(\theta^{H'})$$
$$e^{i(-(\Delta+\phi)+\varphi_2{}^{H'})}) - \arg(\cos(\theta_b)\cos(\theta^{H'}) - \sin(\theta_b)\sin$$
$$(\theta^{H'})e^{i(-(\Delta+\phi)+\varphi_2{}^{H'})}) \qquad (81)$$

In this way, the polarization correction is completed, and when each of the two polarization controllers performs such modulation, the polarization arriving at the measurement terminal is the same. After step 610 is performed, return to step 601.

The embodiments of the present disclosure have been described above. However, these embodiments are for illustrative purposes only and are not intended to limit the scope of the present disclosure. Although the various embodiments are described above separately, this does not mean that measures in the various embodiments cannot be used in combination advantageously. The scope of the present disclosure is defined by the accompanying claims and their equivalents Without departing from the scope of the present disclosure, those skilled in the art may make various substitutions and modifications, all of which should fall within the scope of the present disclosure.

What is claimed is:

1. A quantum key distribution system, comprising:
a sending terminal, configured to generate a quantum optical signal and receive a detection result;
a measurement terminal, comprising:
a beam splitter, configured to generate two measurement optical signals based on the quantum optical signal; and
two single-photon detectors, configured to generate the detection result which is disclosed to the sending terminal and a receiving terminal, wherein the detection result comprises a coincidence count rate, and detection response rates respectively corresponding to different single-photon detectors; and
the receiving terminal, configured to receive the detection result,
wherein the quantum key distribution system further comprises:
at least one polarization controller, provided in the sending terminal, the measurement terminal or the measurement terminal, wherein the at least one polarization controller performs a polarization processing on the quantum optical signal or the detection result using a target transmittance matrix determined based on the detection result, so as to obtain a polarized quantum optical signal or a polarized detection result,
wherein in a case that a polarization controller is provided in the sending terminal, an output terminal of a main component of the sending terminal is connected to the polarization controller; or in a case that a polarization controller is provided in the receiving terminal, an input terminal of a main component of the receiving terminal is connected to the polarization controller; and
wherein the target transmittance matrix is generated by:
obtaining first target parameter values of the polarization controller working under different transmittance matrices in different sub-periods of an $i^{th}$ period, wherein the different transmittance matrices are determined based on an initial transmittance matrix and preset Jones matrices, and the $i^{th}$ period comprises several sub-periods; and
generating the target transmittance matrix for an $(i+1)^{th}$ period based on the first target parameter values.

2. The system according to claim 1, wherein the first target parameter values comprise a first parameter value, a second parameter value, and a third parameter value;
wherein the obtaining first target parameter values of the polarization controller working under different transmittance matrices in different sub-periods of an $i^{th}$ period comprises:
obtaining a coincidence count rate and detection response rates respectively corresponding to different single-photon detectors in a $j^{th}$ sub-period;
generating a bit error rate parameter and the first parameter value in the $j^{th}$ sub-period based on the coincidence count rate and the two detection response rates;
when the bit error rate parameter meets a preset bit error rate threshold, generating a first transmittance matrix based on an initial transmittance matrix of the polarization controller and a first preset Jones matrix;
when the polarization controller works under the first transmittance matrix, generating the second parameter value of the $(j+1)^{th}$ sub-period based on a coincidence count rate and detection response rates respectively corresponding to different single-photon detectors in the $(j+1)^{th}$ sub-period;
generating a second transmittance matrix based on the initial transmittance matrix of the polarization controller and a second preset Jones matrix; and
when the polarization controller works under the second transmittance matrix, generating the third parameter value based on a coincidence count rate and detection response rates in an $(j+2)^{th}$ sub-period, wherein the $i^{th}$ period comprises the $j^{th}$ sub-period, the $(j+1)^{th}$ sub-period, and the $(j+2)^{th}$ sub-period.

3. The system according to claim 2, wherein the generating the target transmittance matrix for an $(i+1)^{th}$ period based on the first target parameter values comprises:
generating a first variable value and a second variable value based on the first parameter value, the second parameter value, and the third parameter value;
generating the target transmittance matrix for the $(i+1)^{th}$ period based on the first variable value, the second variable value, and the initial transmittance matrix.

4. The system according to claim 3, wherein the polarization controller comprises a polarization controller constructed based on at least one phase modulator and a Faraday rotator, or a polarization controller constructed based on a plurality of phase modulators;
wherein the target transmittance matrix is generated by:
for the $j^{th}$ sub-period, when the polarization controller works under the initial transmittance matrix comprising a plurality of first initial sub-parameters, if the bit error rate parameter meets the preset bit error rate threshold, generating the first parameter value of the $j^{th}$ sub-period based on the coincidence count rate and the two detection response rates;
adjusting the plurality of first initial sub-parameters of the polarization controller to obtain the first transmittance matrix comprising a plurality of first sub-parameters;
when the polarization controller works under the first transmittance matrix, generating the second parameter value of the $(j+1)^{th}$ sub-period based on the coincidence count rate and the detection response rates respectively corresponding to different single-photon detectors in the $(j+1)^{th}$ sub-period;
performing a secondary adjustment on the plurality of first initial sub-parameters of the polarization controller to obtain the second transmittance matrix comprising a plurality of second sub-parameters;

when the polarization controller works under the second transmittance matrix, generating the third parameter value of the $(j+2)^{th}$ sub-period based on the coincidence count rate and detection response rates respectively corresponding to different single-photon detectors in the $(j+2)^{th}$ sub-period;

generating a third variable value and a fourth variable value based on the first parameter value, the second parameter value, and the third parameter value; and generating a plurality of target sub-parameters of the target transmittance matrix for the $(i+1)^{th}$ period based on the third variable value, the fourth variable value, and the initial transmittance matrix.

5. The system according to claim 1, wherein in a case that the at least one polarization controller is provided in the measurement terminal, each of an input terminal and an output terminal of a main component of the measurement terminal is connected to a respective one of two polarization controllers;

wherein the target transmittance matrix is generated by:
obtaining a plurality of second target parameter values of each of the two polarization controllers working under different transmittance matrices in different sub-periods of an $i^{th}$ period, wherein the different transmittance matrices are determined based on initial transmittance matrices and preset Jones matrices, and the $i^{th}$ period comprises several sub-periods;

generating a plurality of intermediate parameters based on the plurality of second target parameter values;

generating a plurality of target variable values and a target phase based on the plurality of intermediate parameters and the plurality of second target parameter values; and generating a target transmittance matrix for each of the two polarization controllers for an $(i+1)^{th}$ period based on the plurality of target variable values and the target phase.

6. The system according to claim 5, wherein the second target parameter values comprise a fourth parameter value, a fifth parameter value, and a sixth parameter value;

wherein the obtaining a plurality of second target parameter values of each of the two polarization controllers working under different transmittance matrices in different sub-periods of an $i^{th}$ period comprises:

obtaining a coincidence count rate and detection response rates respectively corresponding to different single-photon detectors in a $j^{th}$ sub-period;

generating a bit error rate parameter and the fourth parameter value in the $j^{th}$ sub-period based on the coincidence count rate and the two detection response rates;

when the bit error rate parameter meets a preset bit error rate threshold, generating a third transmittance matrix for a polarization controller based on initial transmittance matrices of the two polarization controllers and a third preset Jones matrix;

when the polarization controller works under the third transmittance matrix, generating the fifth parameter value of the $(j+1)^{th}$ sub-period based on a coincidence count rate and detection response rates respectively corresponding to different single-photon detectors in the $(j+1)^{th}$ sub-period;

generating a fourth transmittance matrix for the polarization controller based on an initial transmittance matrix of the polarization controller and a fourth preset Jones matrix; and when the polarization controller works under the fourth transmittance matrix, generating the sixth parameter value of an $(j+2)^{th}$ sub-period based on a coincidence count rate and detection response rates in the $(j+2)^{th}$ sub-period.

7. The system according to claim 6, wherein the target variable values comprise a fifth variable value, a sixth variable value, and a seventh variable value;

wherein the generating a plurality of target variable values and a target phase based on the plurality of intermediate parameters and the plurality of second target parameter values comprises:

generating the fifth variable value, the sixth variable value and the seventh variable value based on the plurality of the intermediate parameters;

obtaining a fifth transmittance matrix for each of the two polarization controllers based on the fifth variable value, the sixth variable value and the seventh variable value; and when the two polarization controllers each work under a respective fifth transmittance matrix, generating a seventh parameter value of an $(j+3)^{th}$ sub-period based on a coincidence count rate and detection response rates in the $(j+3)^{th}$ sub-period, wherein the $i^{th}$ period comprises the $j^{th}$ sub-period, the $(j+1)^{th}$ sub-period, the $(j+2)^{th}$ sub-period, and the $(j+3)^{th}$ sub-period; and generating the target phase based on the fifth variable value, the sixth variable value and the seventh parameter value.

8. The system according to claim 7, wherein the target variable values comprise a fifth variable value, a sixth variable value, and a seventh variable value;

wherein the generating a target transmittance matrix for each of the two polarization controllers for an $(i+1)^{th}$ period based on the plurality of target variable values and the target phase comprises:

generating the target transmittance matrix for each of the two polarization controllers for the $(i+1)^{th}$ period based on the fifth variable value, the sixth variable value, the seventh variable value, and the target phase.

9. The system according to claim 7, wherein the polarization controller comprises a polarization controller constructed based on at least one phase modulator and a Faraday rotator, or a polarization controller constructed based on a plurality of phase modulators;

wherein the target transmittance matrix is generated by:
for the $j^{th}$ sub-period, when each of the two polarization controllers works under an initial transmittance matrix comprising a plurality of second initial sub-parameters, if the bit error rate parameter meets the preset bit error rate threshold, generating the fourth parameter value of the $j^{th}$ sub-period based on the coincidence count rate and the two detection response rates;

adjusting the plurality of second initial sub-parameters of a polarization controller to obtain the third transmittance matrix comprising a plurality of third sub-parameters;

when the polarization controller works under the third transmittance matrix, generating the fifth parameter value of the $(j+1)^{th}$ sub-period based on the coincidence count rate and the detection response rates corresponding to different single-photon detectors in the $(j+1)^{th}$ sub-period;

performing a secondary adjustment on the plurality of second initial sub-parameters of the polarization controller to obtain the fourth transmittance matrix comprising a plurality of fourth sub-parameters;

when the polarization controller works under the fourth transmittance matrix, generating the sixth parameter value of the $(j+2)^{th}$ sub-period based on the coincidence count rate and the detection response rates corresponding to different single-photon detectors in the $(j+2)^{th}$ sub-period;

generating the plurality of intermediate parameters based on the fourth parameter value, the fifth parameter value, and the sixth parameter value;

generating the fifth variable value, the sixth variable value and the seventh variable value based on the plurality of the intermediate parameters;

obtaining the fifth transmittance matrix for each of the two polarization controllers based on the fifth variable value, the sixth variable value and the seventh variable value;

when the two polarization controllers each work under a respective fifth transmittance matrix, generating the seventh parameter value of the $(j+3)^{th}$ sub-period based on the coincidence count rate and the detection response rates in the $(j+3)^{th}$ sub-period, wherein the $i^{th}$ period comprises the $j^{th}$ sub-period, the $(j+1)^{th}$ sub-period, the $(j+2)^{th}$ sub-period, and the $(j+3)^{th}$ sub-period; and generating the target phase based on the fifth variable value, the sixth variable value and the seventh parameter value; and generating the target transmittance matrix for each of the two polarization controllers for the $(i+1)^{th}$ period based on the fifth variable value, the sixth variable value, the seventh variable value, and the target phase.

\* \* \* \* \*